(12) United States Patent
Shevenell et al.

(10) Patent No.: US 10,116,547 B2
(45) Date of Patent: Oct. 30, 2018

(54) COVERAGE POLICY-BASED TESTING IN COMPUTER NETWORKS

(71) Applicant: CA, Inc., New York, NY (US)

(72) Inventors: Michael Shevenell, Dover, NH (US); John Murdough, Strafford, NH (US)

(73) Assignee: CA, Inc., New York, NY (US)

( * ) Notice: Subject to any disclaimer, the term of this patent is extended or adjusted under 35 U.S.C. 154(b) by 485 days.

(21) Appl. No.: 14/716,185

(22) Filed: May 19, 2015

(65) Prior Publication Data

US 2016/0344609 A1 Nov. 24, 2016

(51) Int. Cl.
*H04L 12/26* (2006.01)
*H04L 12/28* (2006.01)
*H04L 12/24* (2006.01)
*H04L 1/24* (2006.01)

(52) U.S. Cl.
CPC .............. *H04L 43/50* (2013.01); *H04L 41/04* (2013.01); *H04L 41/0893* (2013.01); *H04L 43/028* (2013.01)

(58) Field of Classification Search
CPC ..... H04L 43/50; H04L 41/04; H04L 41/0893; H04L 43/028
See application file for complete search history.

(56) References Cited

U.S. PATENT DOCUMENTS

| | | | | | |
|---|---|---|---|---|---|
| 8,082,362 | B1* | 12/2011 | Ewing | .................. | G06F 17/302 370/241 |
| 2003/0191590 | A1* | 10/2003 | Narayan | ................. | H04L 43/50 702/68 |
| 2008/0072050 | A1* | 3/2008 | Klonover | .............. | H04L 63/029 713/176 |
| 2009/0143020 | A1* | 6/2009 | Kotabe | ............... | H04L 41/5067 455/67.11 |
| 2011/0069622 | A1* | 3/2011 | Gintis | ..................... | H04L 43/50 370/251 |
| 2012/0051263 | A1* | 3/2012 | Ozawa | ............... | H04L 12/4641 370/254 |
| 2013/0305091 | A1* | 11/2013 | Stan | ..................... | G06F 11/263 714/35 |
| 2014/0105044 | A1* | 4/2014 | Baillargeon | ........ | H04L 43/0835 370/252 |
| 2016/0112295 | A1* | 4/2016 | Blankenship | ....... | H04L 41/0806 709/224 |

* cited by examiner

*Primary Examiner* — Quang N Nguyen
*Assistant Examiner* — Billy H Ng
(74) *Attorney, Agent, or Firm* — Meyertons, Hood, Kivlin, Kowert & Goetzel, P.C.

(57) ABSTRACT

Methods, systems, and computer-readable storage mediums for policy-based testing of computer networks may involve identifying a set of network nodes within a network, and iteratively filtering the set of network nodes in accordance with a testing policy comprising at least one policy rule. Iteratively filtering may include, in an initial iteration, filtering out network nodes that are endpoints of the network from the set of network nodes. Iteratively filtering may further include, for each subsequent iteration, determining a filter criteria from one or more of the policy rules, and filtering out network nodes from the set of network nodes produced by the immediately previous iteration based on the filter criteria. The policy-based testing further comprises invoking a network test scheme that is compliant with the testing policy and is limited to execution against the set of network nodes produced by the iterative filtering.

17 Claims, 9 Drawing Sheets

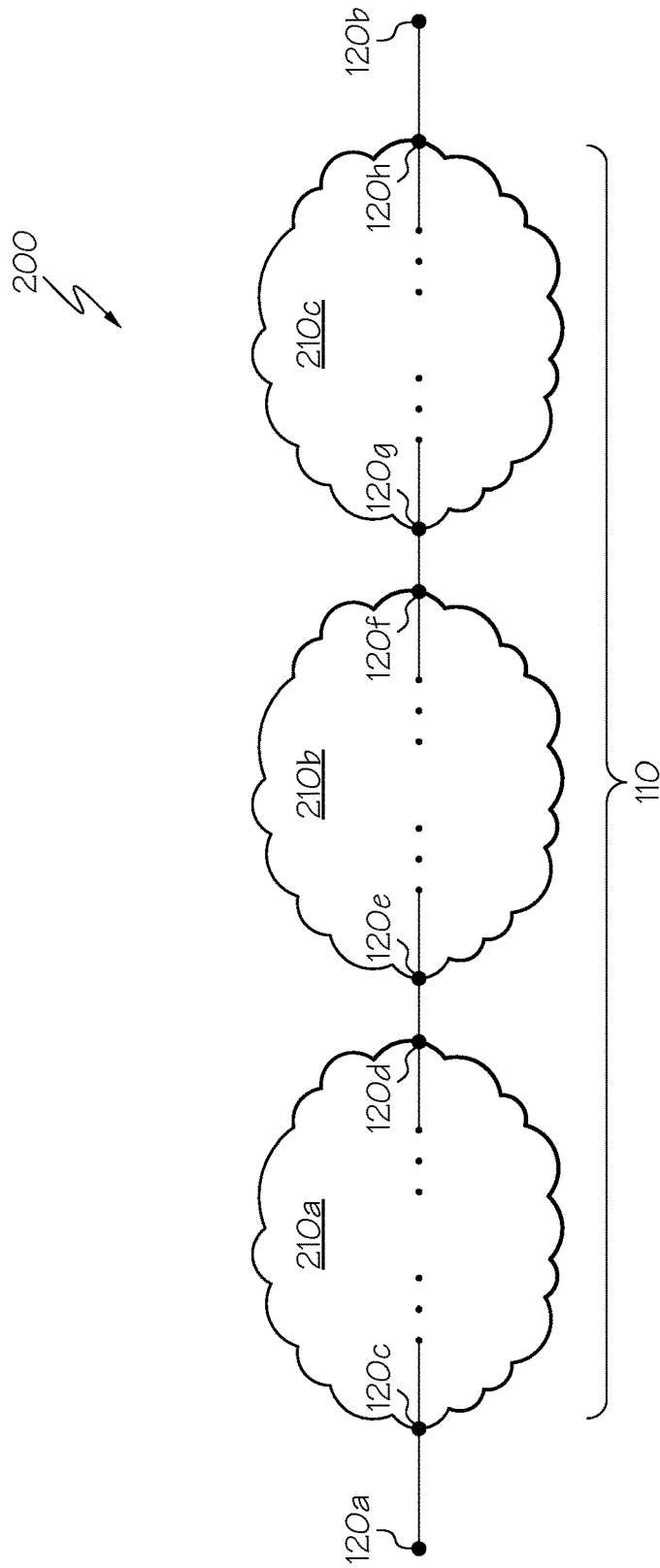

INITIAL SET: 120a-s

| ITERATION | SUBSET |
|---|---|
| 1 | 120c-s |
| 2 | 120e-f, i-s |
| 3 | 120 f, i, l-s |
| 4 | 120 l-o |
| 5 | 120n |

COVERAGE POLICY-BASED TESTING IN COMPUTER NETWORKS

BACKGROUND

Computer networks enable the interconnection of network nodes for the exchange of data. Many such networks are tremendously complex. The Internet, for example, contains a large number of physical and logical network boundaries, employs a variety of network topologies, and interconnects a broad diversity of endpoints and intermediate nodes. Computer networks also support myriad network services, which are typically expected to execute smoothly despite a highly diverse networking environment. The complexity of a given network can make network testing particularly challenging.

BRIEF SUMMARY

The present disclosure provides methods, systems, and computer-readable storage mediums for policy-based testing of computer networks.

In one embodiment, a method comprises identifying a set of network nodes within a network, and iteratively filtering the set of network nodes in accordance with a testing policy comprising at least one policy rule. According to the method, iteratively filtering comprises, in an initial iteration, filtering out network nodes that are endpoints of the network from the set of network nodes. Iteratively filtering further comprises, for each subsequent iteration, determining a filter criteria from one or more of the policy rules, and filtering out network nodes from the set of network nodes produced by the immediately previous iteration based on the filter criteria. The method further comprises invoking a network test scheme that is compliant with the testing policy and is limited to execution against the set of network nodes produced by the iterative filtering.

In another embodiment, a system comprises processing circuitry that is communicatively coupled to memory circuitry. The memory circuitry is configured to store a testing policy comprising at least one policy rule. The processing circuitry is configured to identify a set of network nodes within a network, and iteratively filter the set of network nodes in accordance with the testing policy. To iteratively filter, the processing circuitry is configured to, in an initial iteration, filter out network nodes that are endpoints of the network from the set of network nodes. For each subsequent iteration, the processing circuitry is configured to determine a filter criteria from one or more of the policy rules, and filter out network nodes from the set of network nodes produced by the immediately previous iteration based on the filter criteria. The processing circuitry is further configured to invoke a network test scheme that is compliant with the testing policy and is limited to execution against the set of network nodes produced by the iterative filtering.

In another embodiment, a computer readable storage medium comprises computer program code stored thereon that, when executed by a processing circuit of a computing device, configures the processing circuit to identify a set of network nodes within a network, and iteratively filter the set of network nodes in accordance with a testing policy comprising at least one policy rule. To iteratively filter, the processing circuit is configured to, in an initial iteration, filter out network nodes that are endpoints of the network from the set of network nodes. For each subsequent iteration, the processing circuit is configured to determine a filter criteria from one or more of the policy rules, and filter out network nodes from the set of network nodes produced by the immediately previous iteration based on the filter criteria. The processing circuit is further configured to invoke a network test scheme that is compliant with the testing policy and is limited to execution against the set of network nodes produced by the iterative filtering.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 2 is a logical diagram illustrating a communication path across physical boundaries of a network, according to one or more embodiments of the present disclosure.

DETAILED DESCRIPTION

Figure 1:
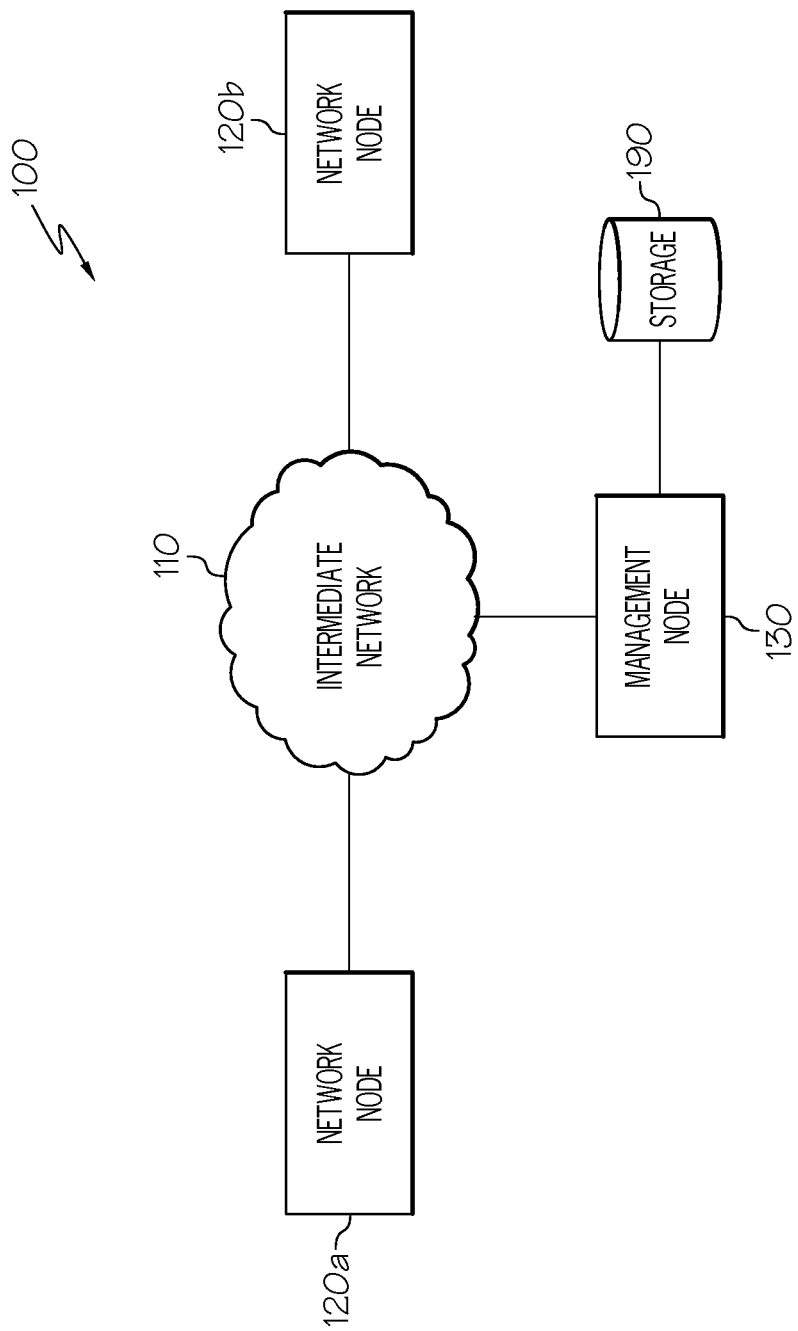
FIG. 1 is a logical diagram illustrating a network, according to one or more embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computer-implemented method, system, and computer readable storage medium comprising corresponding computer program code for policy-based testing of a computer network. FIG. 1 illustrates an exemplary network 100 to which such policy-based testing may be applied. The network 100 comprises network nodes 120a-b, intermediate network 110, management node 130, and storage 190. Network nodes 120a-b are connected to each other via the intermediate network 110, and are also endpoints of the network 100. Management node 130 is also connected to the intermediate network 110, and may be an endpoint (as depicted in FIG. 1) or an intermediate node of the network 100, according to particular embodiments. The management node 130 is also connected to storage 190. Although FIG. 1 depicts storage 190 as entirely external from, and connected to, management node 130, storage 190 may alternatively be included, partially or entirely, within management node 130, according to one or more embodiments other than that depicted by FIG. 1. As will be explained in greater detail below, the management node 130 may be used to invoke a network test scheme that is compliant with a testing policy, and is limited to execution against a set of network nodes within the network 100.

Communication between network nodes 120a-b may be facilitated through the intermediate network 110 using a plurality of intermediate network nodes 120. FIG. 2 illustrates an example communication path 200 between network nodes 120a-b that passes through the intermediate network 110. The intermediate network 110 in this example comprises three distinct physical networks 210a-c. Each physical network 210a-c in this example comprises a plurality of network nodes 120c-h along the communication path 200. As depicted in the example of FIG. 2, physical network 210a comprises at least network nodes 120c-d, physical network 210b comprises at least network nodes 120e-f, and physical network 210c comprises 120g-h, all of which are along communication path 200. Each of the example network nodes 120c-h is located at a physical boundary of its corresponding physical network 210a-c, thereby enabling ingress/egress of communication thereto/therefrom.

According to other embodiments, the communication path 200 may pass through additional, fewer, or different physical networks 210 than the three example physical networks 210a-c depicted in FIG. 2. Further, each physical network 210a-c may also comprise network nodes 120 that are not along the communication path 200. Further, management node 130 (not depicted in FIG. 2) may be an endpoint or intermediate node located anywhere in the network 100, and also may, or may not, be along the communication path 200, depending on the particular embodiment. In addition, one or more of the network nodes 120c-h may, for example, be a router, gateway, switch, hub, and/or firewall. Each physical network 210a-c may also have one or more network endpoints attached. As depicted in the example of FIG. 2, network node 120a is a network endpoint attached to physical network 210a, and network node 120b is a network endpoint attached to physical network 210c. No network endpoints are attached to physical network 210b in the example of FIG. 2.

A physical network 210 may be defined according to its physical or geographic boundaries, range, and/or location. For example, one or more of physical networks 210a-c may be a wide area network (WAN), metropolitan area network (MAN), local area network (LAN), or personal area network (PAN). As one example, a physical network 210 along the communication path 200 may be a Tier 1 backbone WAN that is dedicated to transporting data traffic between smaller physical networks 210 along the northeast of the United States, and therefore may have relatively few attached network endpoints (or perhaps none at all) as compared to other physical networks 210. As another example, a physical network 210 may be a LAN for a helpdesk call center, and therefore may have a relatively high number of attached network endpoints as compared to other physical networks 210.

Figure 3A:
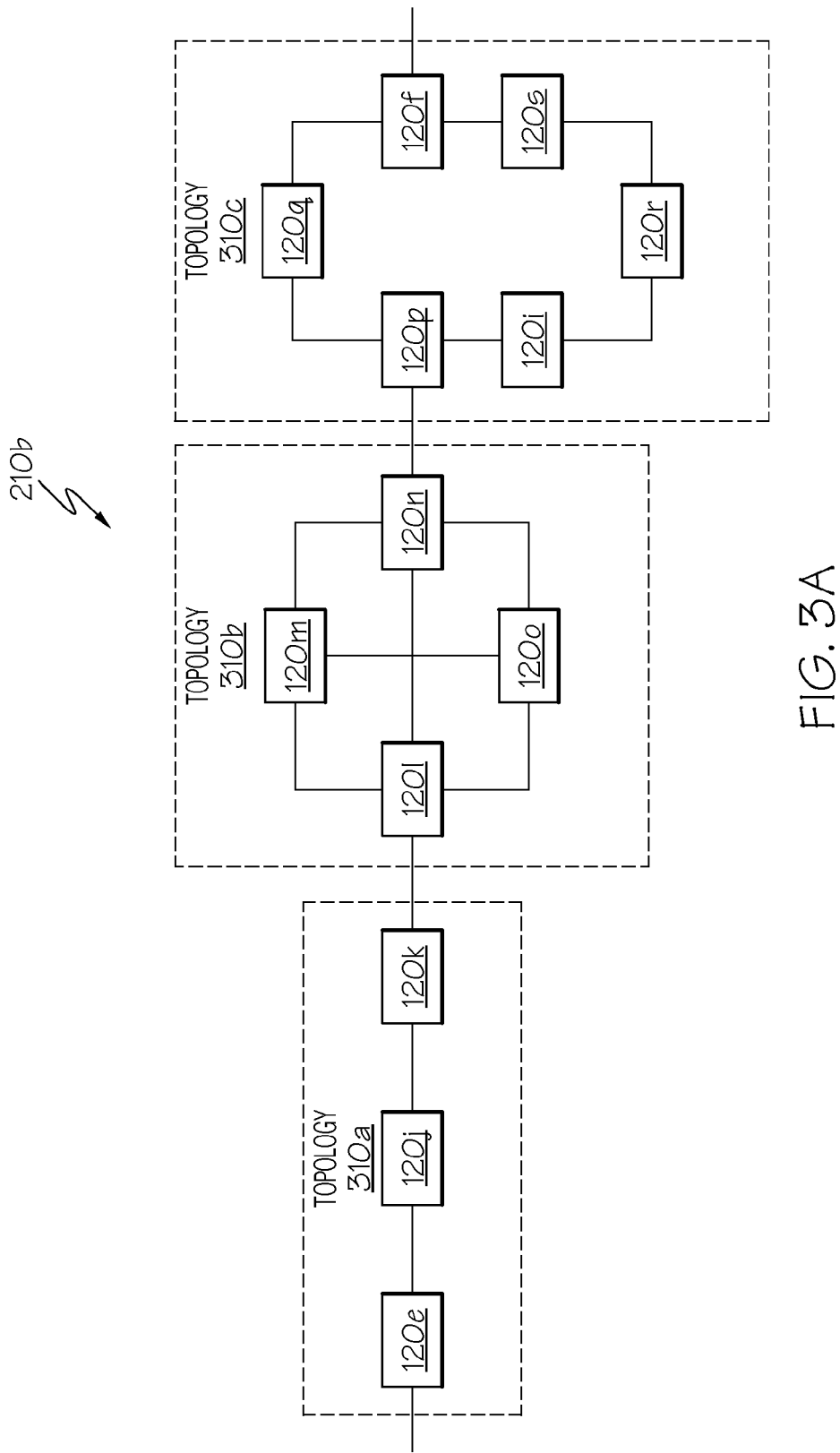
FIG. 3A is a logical diagram illustrating three topologies within a physical network, according to one or more embodiments of the present disclosure.

The network nodes 120 of a physical network 210 may be organized according to one or more topologies. FIG. 3A illustrates three example network topologies 310a-c that may be comprised within physical network 210b, according to one or more embodiments. Collectively, topologies 310a-c comprise thirteen network nodes 120e-f, 120 i-s. Topology 310a is a linear topology that contains three network nodes 120e, 120j-k. Topology 310b is a fully-meshed topology that contains four network nodes 120l-o. Topology 310c is a ring topology that contains six network nodes 120f, 120i, 120p-s. Network nodes 120e-f may be edge routers that control ingress and egress of communications to and from the physical network 210b. Other embodiments of a physical network 210 may implement additional, fewer, or different topologies 310 than those implemented by physical network 210b. Although FIG. 3A depicts three topologies 310a-c that are entirely disjoint, other embodiments of a physical network 210 may organize network nodes 120 according to topologies 310 that intersect or are nested.

Figure 3B:
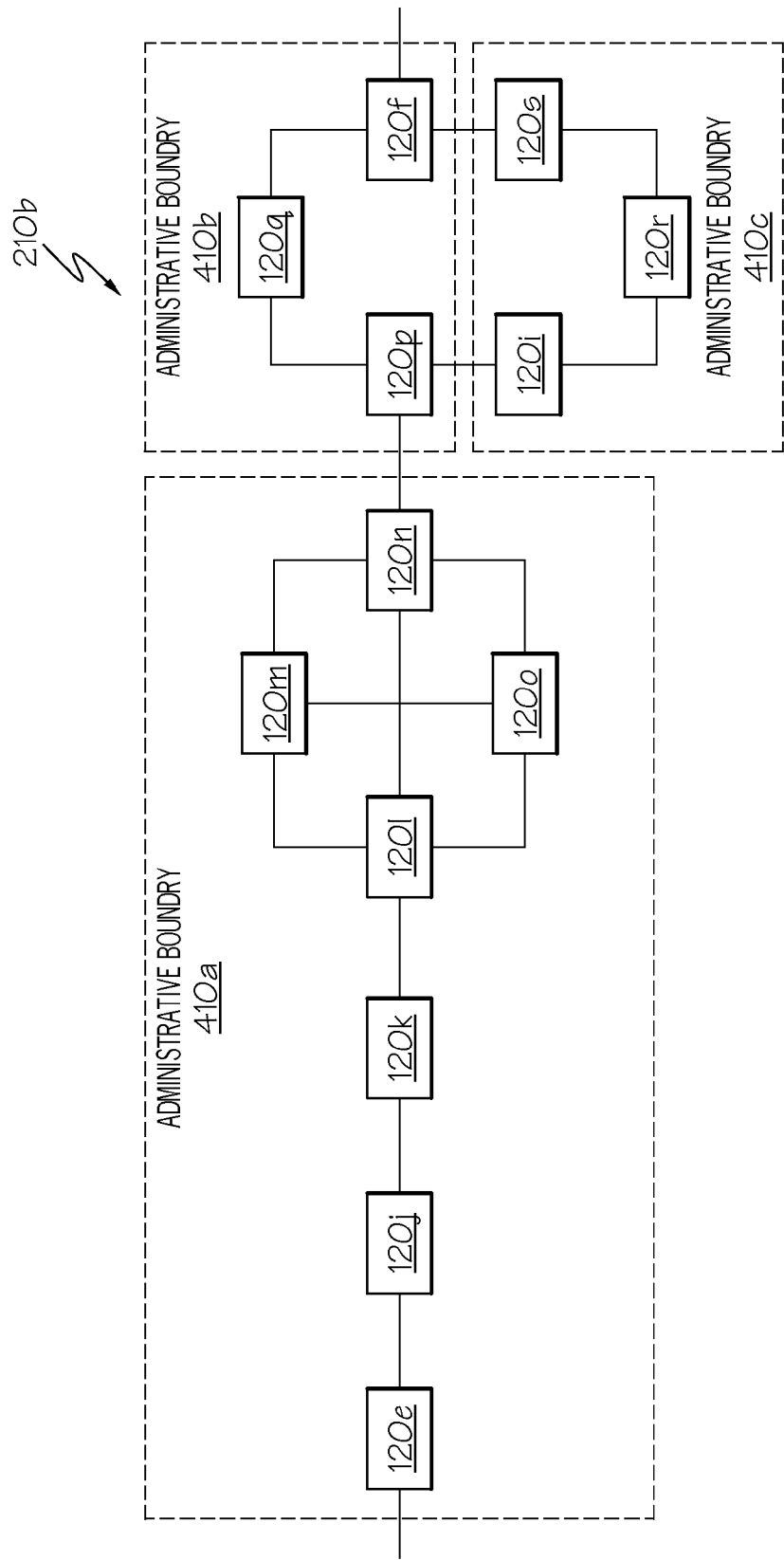
FIG. 3B is a logical diagram illustrating three administrative boundaries within a physical network, according to one or more embodiments of the present disclosure.

A physical network 210 may also manage network nodes 120 according to one or more administrative boundaries (or zones). FIG. 3B illustrates that the example physical network 210b implements three administrative boundaries 410a-c. Administrative boundary 410a contains seven network nodes 120e, 120j-o. Administrative boundary 410b contains three network nodes 120f, 120p-q. Administrative boundary 410c contains three network nodes 120i, 120r-s.

An administrative boundary 410 is a logical partition within the physical network 210 that facilitates management of the network nodes 120 therein. For example, the network nodes 120i, 120r-s within administrative boundary 410c may be reserved for high-priority users only, and may have more stringent security requirements enacted as compared to the network nodes 120f, 120p-q in administrative boundary 410b. An administrative boundary 410 may be entirely within a particular network topology 310, or may span across multiple topologies 310. For example, with further reference to FIG. 3A, administrative boundary 410a spans the entirety of linear topology 310a and fully-meshed topology 310b, whereas administrative boundaries 410b-c are entirely within ring topology 310c. Although FIG. 3B depicts three administrative boundaries 410a-c that are entirely disjoint, other embodiments of a physical network 210 may define administrative boundaries 410 that intersect, are nested, or serve any number of administrative purposes.

Figure 3C:
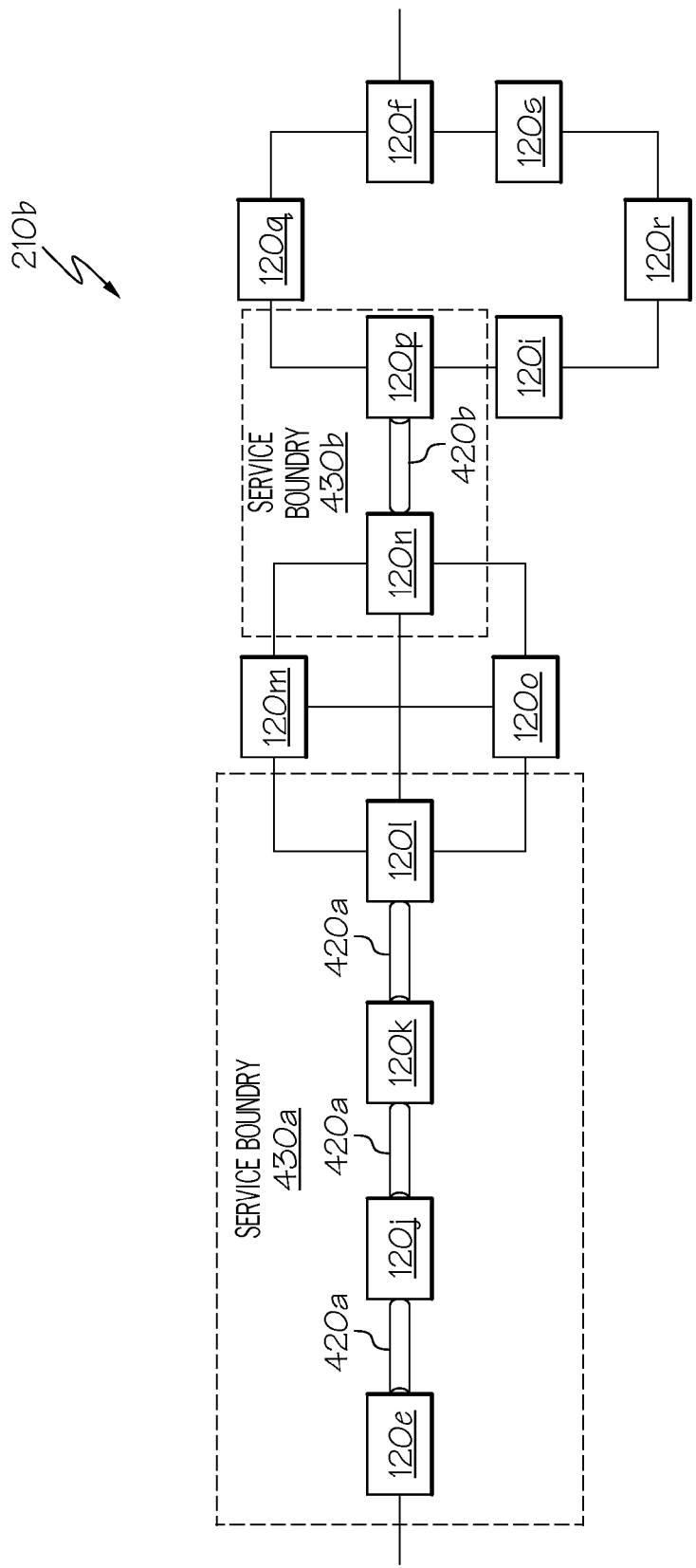
FIG. 3C is a logical diagram illustrating two service boundaries within a physical network, according to one or more embodiments of the present disclosure.

A physical network 210 may also support the operation of one or more services, such as Internet Protocol Security (IPSec), for example. FIG. 3C illustrates that the example physical network 210b implements two service boundaries 430a-b established by respective IPSec tunnels 420a-b. With further reference to FIG. 3B, IPSec tunnel 420a is entirely within administrative boundary 410a, and flows between network node 120e and 120l via network nodes 120j and 120k. An IPSec tunnel 420b spans across administrative boundaries 410a-b, flowing between network nodes 120n and 120p. In addition, and with further reference to FIG. 3A, IPSec tunnel 420a spans linear topology 310a and fully-meshed topology 310b, whereas IPSec tunnel 420b spans fully-meshed topology 310b and ring topology 310c. Thus, a service boundary 430 may be defined by the extent to which a service operates within the physical network 210, and may be relevant to any number of topologies 310 and administrative boundaries 410 therein. Although FIG. 3C depicts two service boundaries 430a-b that are entirely disjoint, other embodiments of a physical network 210 may support services that establish intersecting and/or nested service boundaries 430. Further, although service boundaries 430a-b have been discussed in terms of IPSec, other service boundaries 430 may be similarly established by the operation of services other than IPSec.

Figure 4:
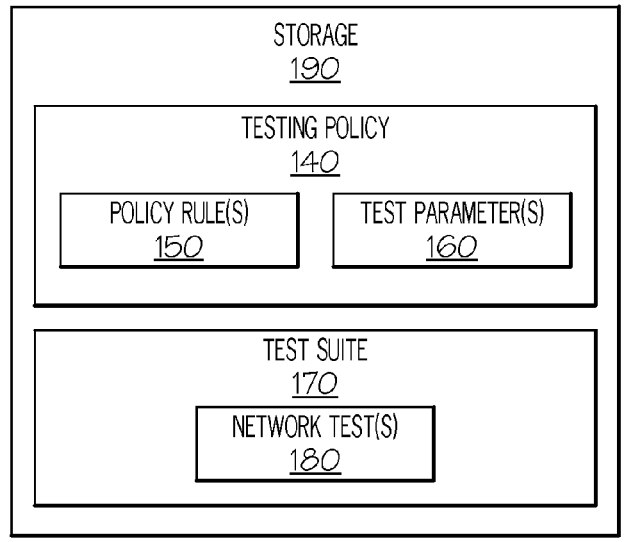
FIG. 4 is a logical diagram illustrating an example of stored resources useful for enabling policy-based testing of a network, according to one or more embodiments of the present disclosure.

The potential complexity of the network 100 often makes determining the proper amount of network test coverage difficult. Although exhaustively testing every network node 120 in the network 100 may provide completeness, such exhaustive testing can be wasteful. On the other hand, while reducing network test coverage may make testing of a network 100 more efficient, network test coverage that is too narrow may produce inaccurate results. To invoke a network test scheme that will execute against one or more network nodes 120 in the network 100, the management node 130 may make use of various resources stored in storage 190. These resources may, for example, assist the management node 130 in determining an appropriate amount of test coverage. An example of storage 190 containing such resources is illustrated in FIG. 4. The example storage 190 stores a testing policy 140 and a test suite 170. The test suite 170 comprises one or more network tests 180 that may be invoked to execute against network nodes 120 within the network 100. The testing policy 140 comprises one or more policy rules 150 for performing policy-based testing of the network 100. The testing policy 140 also comprises, according to one or more embodiments, one or more test parameters 160 useful for configuring the one or more network tests 180.

As previously discussed, storage 190 may be comprised partially or entirely within management node 130, or may be separate from, and connected to, management node 130 (as depicted in FIG. 1). Accordingly, one or more of the testing policy 140, the policy rule(s) 150, the test parameter(s) 160, the test suite 170, and the network test(s) 180 may be stored partially or entirely within management node 130, or may be stored separately from the management node 130 and accessed via a network as needed. Further, particular examples of the testing policy 140 may forego the test parameter(s) 160. For example, the one or more of the network test(s) 180 may be capable of executing according to a default configuration, or according to only a single configuration, such that test parameter(s) 160 are not needed.

A policy rule 150 may, for example, specify a quantity of network nodes 120 out of a total number of network nodes 120 in the set of network nodes 120 to which testing is to be limited. As one example, the testing policy may require that a network test scheme test at least 50% of the network nodes 120 within the network 100 in order for the network test scheme to be in compliance with the testing policy 140. To determine which 50% of the network nodes 120 should be tested, the management node 130 may iteratively filter out network nodes 120 according to one or more additional policy rules 150 within the testing policy 140, such as described above, for example.

The testing policy 140 may additionally or alternatively have one or more policy rules 150 specifying coverage requirements for one or more service boundaries 430, topologies 410, administrative boundaries 420, networking layers (e.g., layers of the Open Systems Interconnection (OSI) Model), network address ranges, traffic classes, physical networks 210, and the like. For example, the testing policy 140 may have one or more policy rules 150 that require that all network nodes 120 having an IP address beginning with the number 9, at least 15% of all virtual LANs (VLANs), all network nodes in China and the United States, and at least 3 network nodes that are being managed by an Internet Service Provider (ISP), be tested in order to be in compliance with the testing policy 140. The testing policy 140 may also include various test parameters 160 that are useful for invoking a particular test scheme. For example, the testing policy 140 may also include a username and password that a test may need to access particular network nodes 120 in the network 100, may indicate that testing be limited to execution against layer 3 of the OSI model, and may specify a minimum duration and/or repetitions for testing. Thus, the testing policy 140 may, according to one or more embodiments, be quite simple, or quite complex.

Figure 5:
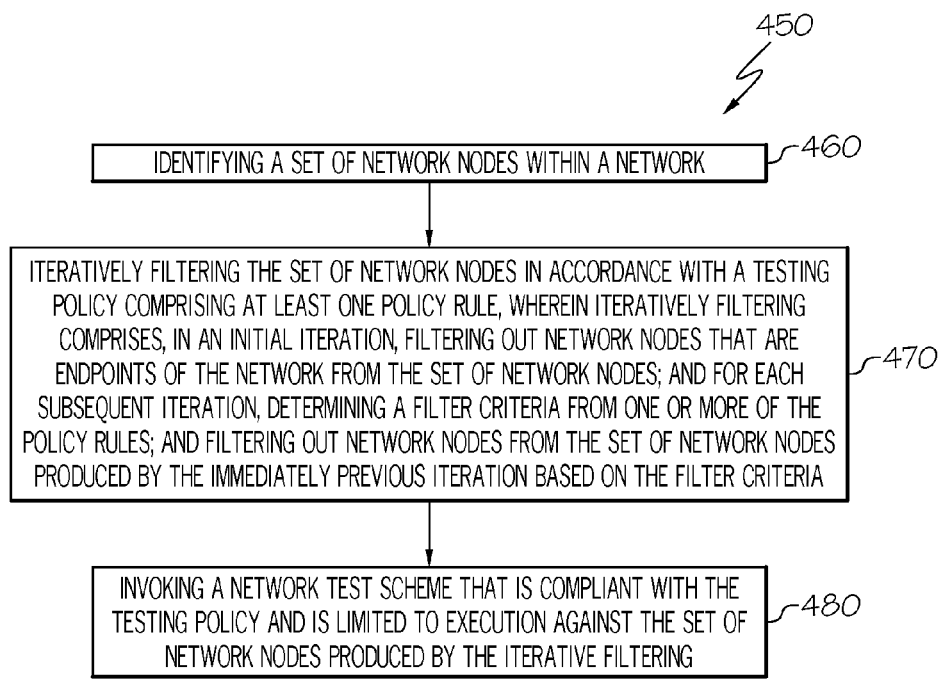
FIG. 5 is a flow diagram illustrating a method for policy-based testing of a computer network, according to one or more embodiments of the present disclosure.

In view of the potentially highly complex testing policy 140, and the potentially highly complex network 100 to be tested, determining the network nodes 120 to test that will result in a network test scheme that is compliant with the testing policy 140 may be non-trivial. Notwithstanding, invoking a network test scheme that is compliant with the testing policy 140 may, according to one or more embodiments, be accomplished by iteratively filtering a set of network nodes 120 within a network 100 to determine a subset of network nodes to be tested. FIG. 5 illustrates an example method 450 according to one or more embodiments of the present disclosure. The method 450 comprises identifying a set of network nodes 120 within a network 100 (block 460), and iteratively filtering the set of network nodes 120 in accordance with a testing policy 140 comprising at least one policy rule 150 (block 470). According to the method 450, iteratively filtering comprises, in an initial iteration, filtering out network nodes 120 that are endpoints of the network 100 from the set of network nodes 120. Iteratively filtering further comprises, for each subsequent iteration, determining a filter criteria from one or more of the policy rules 150, and filtering out network nodes 120 from the set of network nodes 120 produced by the immediately previous iteration based on the filter criteria. The method 450 further comprises invoking a network test scheme that is compliant with the testing policy 140 and is limited to execution against the set of network nodes 120 produced by the iterative filtering (block 480).

Figure 6:
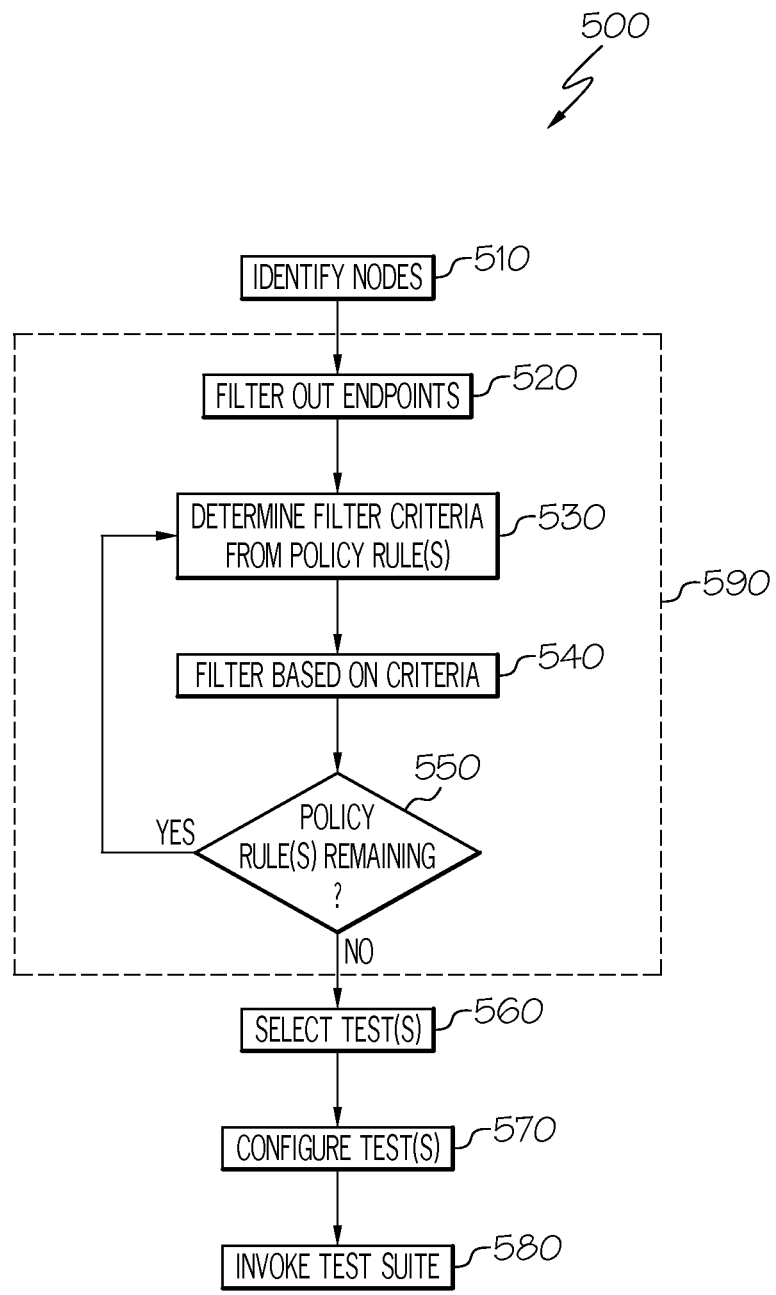
FIG. 6 is a flow diagram illustrating a more detailed method for policy-based testing of a computer network, according to one or more embodiments of the present disclosure.

FIG. 6 illustrates a more detailed method 500 according to one or more embodiments of the present disclosure. To begin the method 500, a management node 130 identifies a set of network nodes 120 within a network 100 (block 510). The management node 130 then begins iteratively filtering the set of network nodes 120 in accordance with a testing policy 140 (region 590). In an initial iteration, the management node 130 filters out network nodes 120 that are endpoints of the network 100 from the set of identified network nodes 120 to produce a new set of network nodes 120 (block 520). The management node 130 then determines a filter criteria from one or more policy rules 150 in the testing policy 140 (block 530). Based on the filter criteria, the management node 130 filters out network nodes 120 from the set of network nodes 120 produced by the immediately previous iteration, (e.g., the new set of network nodes 120 produced after filtering out endpoints) (block 540).

The management node 130 then checks whether there are one or more policy rules 150 remaining in the testing policy 140 that have yet to be addressed by the method 500 (block 550). If so, the method 500 will again determine filter criteria from policy rules 150 within the testing policy 140 (block 530) and filter out network nodes 120 from the set of network nodes produced by the immediately previous iteration based on that filter criteria (block 540). Thus, the management node 130 may iterate, for example, until all policy rules 150 in the testing policy 140 have been evaluated by the management node 130 (blocks 550, 530, 540). Once no policy rules 150 remain unevaluated by the management node 130, the management node 130 selects one or more tests 180 to participate in a network test scheme from a suite 170 of available tests 180 based on the network nodes 120 that were produced by the iterative filtering (block 560). The management node 130 also configures execution of the one or more tests 180 selected to participate in the network test scheme according to one or more test parameters 160 specified by the testing policy 140 (block 570). The management node 130 then invokes a network test scheme that is compliant with the testing policy 140 and is limited to execution against the set of network nodes 120 produced by the iterative filtering (block 580).

Figures 7, 8:
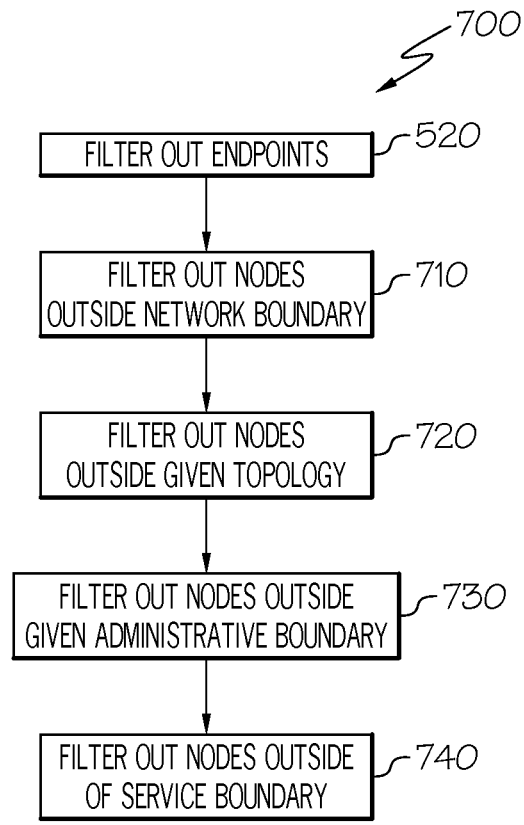
FIG. 7 is a flow diagram illustrating an example of iteratively filtering network nodes, according to one or more embodiments of the present disclosure.
FIG. 8 is a table illustrating an example of the results produced at each iteration when iteratively filtering a set of network nodes according to one or more embodiments of the present disclosure.

Iteratively filtering the set of network nodes according to the testing policy 140 may be performed according to a wide variety of embodiments. An example 700 of this iterative filtering is illustrated in FIG. 7. According to the example 700 of FIG. 7, iteratively filtering comprises, in a first iteration, filtering out network nodes 120 that are endpoints of the network 100 from the set of network nodes 120, as previously explained (step 520). In a second iteration of the example 700, iteratively filtering comprises filtering out network nodes 120 from the set of network nodes 120 produced by the first iteration based on location within the network 100 relative to a network boundary 210 (step 710). In a third iteration of the example 700, iteratively filtering comprises filtering out network nodes 120 from the set of network nodes 120 produced by the second iteration based on a type of network topology 310 to which the respective network node 120 belongs (step 720). In a fourth iteration of the example 700, iteratively filtering comprises filtering out network nodes 120 from the set of network nodes 120 produced by the third iteration based on location within the network 100 relative to a particular administrative boundary 410 within the network 100. In a fifth iteration of the example 700, iteratively filtering comprises filtering out network nodes 120 from the set of network nodes 120 produced by the fourth iteration based on location within the network 100 relative to a type of service boundary 430 within the network. For each iteration after the first iteration, according to the example 700, the filtering out is based on a filter criteria determined from one or more policy rules 150 of the testing policy 140, as previous described. Iteratively filtering according to other embodiments (i.e., other than the example 700) may comprise additional, fewer, or different iterations, in any order, as appropriate for the corresponding testing policy 140 to be used.

FIG. 8 is a table illustrating an example of the results produced by iteratively filtering a set of network nodes according to the example 700 of FIG. 7. The example of FIG. 8 uses an initial set of network nodes 120*a-s* have been identified within the network 100 by the management node 130. In an initial iteration (block 520), endpoint network nodes 120*a-b* (as illustrated by FIG. 1) are filtered out of the initial set of network nodes 120*a-s*, producing a first subset of network nodes 120*c-s*. The management node 130 also determines a filter criteria from one or more policy rules 150 in the testing policy 140 for each iteration subsequent to the initial iteration. In a second iteration (block 710), network nodes 120*c-d*, 120*g-h* that are outside of physical network 210*b* (as illustrated by FIG. 2) are filtered out of the first subset of network nodes 120*c-s* to produce a second subset of network nodes 120*e-f*, 120*i-s*. In a third iteration (block 720), network nodes 120*e*, 120*j-k* in linear topology 310*a* (as illustrated by FIG. 3A) are filtered out of the second subset of network nodes 120*e-f*, 120*i-s* to produce a third subset of network nodes 120*f*, 120*i*, 120*l-s*. In a fourth iteration (block 730), network nodes 120*f*, 120*i*, 120*p-s* in administrative boundaries 410*b-c* (as illustrated by FIG. 3B) are filtered out of the third subset of network nodes 120*f*, 120*i*, 120*l-s* to produce a fourth subset of network nodes 120*l-o*. In a fifth iteration (block 740), network nodes 120*l-m*, 120*o* that are outside of service boundary 430*b* (as illustrated by FIG. 3C) are filtered out of the fourth subset of network nodes 120*l-o* to produce a fifth and final subset comprising a single network node 120*n*. Thus, iteratively filtering may, according to one or more embodiments, produce a final set comprising only a single network node 120 to which execution of a policy-compliant network test scheme will be limited. Other embodiments may produce additional or different network nodes 120, depending on what filter criteria may be determined from the testing policy 140 configured at, or made available to, the management node 130.

Invoking the network test scheme may include the management node 130 selecting a subset of tests from a plurality of available tests 180, provisioning the selected tests for execution on particular network nodes 120, and configuring the selected tests for execution against the network nodes 120 produced by the iterative filtering. The management node 130 may also invoke the network test scheme such that one or more tests run continuously or periodically such that changes within the network 100 may be monitored and issues flagged by the network test scheme over a particular overall duration, or on an open-ended basis. The management node 130 may further receive notifications as tests fail, or discover issues. For example, the management node 130 may receive a notification from an executing test that a network node 120 under test is non-compliant with the testing policy 140.

Results derived from execution of the network test scheme may be useful for a wide variety of purposes. For example, such results may be used by an administrator of the network 100 to perform Operations, Administration, and Management (OAM) testing during live deployment of the network 100. As another example, results from the network test scheme may be useful for planning expansion, upgrades, or changes to the network 100, including decommissioning network nodes 120, modifying the services offered by the remaining network nodes 120, and adding new network nodes 120. As a further example, the results from the network test scheme may be used during hardware development to determine whether a particular network node 120, or product thereon, is complaint with a particular protocol or standards specification, to determine whether network node 120 performance and capabilities deteriorate over time, and determine the extent to which one or more network nodes 120 are interoperable with one or more other network nodes 120. Other examples of how the results produced by execution of tests 180 participating in the network test scheme are abundant, and may be apparent to those of ordinary skill in view of the above.

Figure 9:
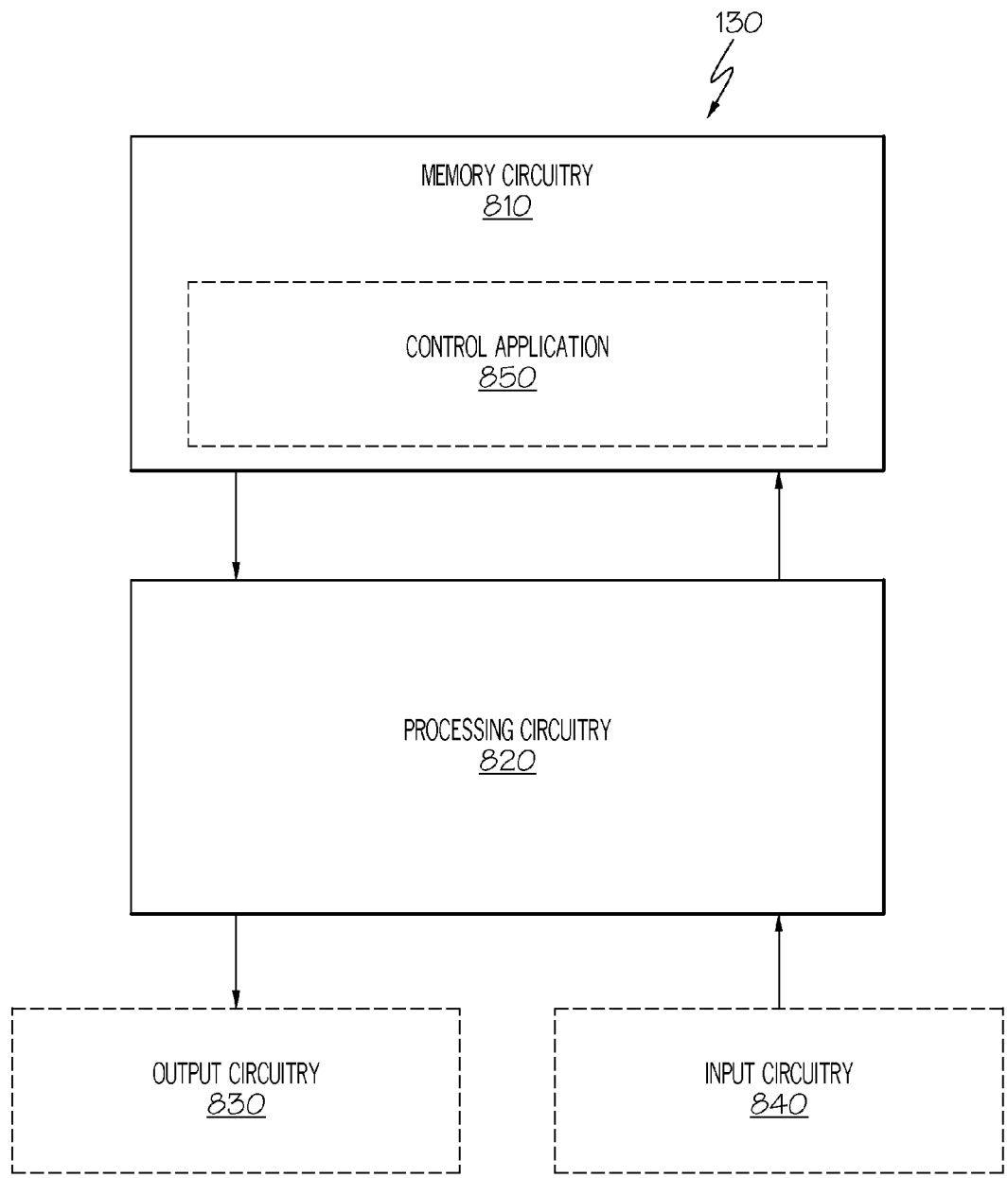
FIG. 9 is a block diagram illustrating the physical circuitry of a system configured to test a network, according to one or more embodiments of the present disclosure.

FIG. 9 illustrates example hardware of the management node 130 operating as a system, according to one or more embodiments. The management node 130 comprises processing circuitry 820 that is communicatively coupled to memory circuitry 810, output circuitry 830, and input circuitry 840, e.g., via one or more buses. The processing circuitry 820 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry may be programmable hardware capable of executing machine instructions stored as a machine-readable computer program 850 in the memory circuitry 810. The memory circuitry 810 of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. For example, the memory circuitry 810 may be a local physical device configured to operate as the above-discussed storage 190.

The output circuitry 830 may be configured to output signals for display to a user, or to send communication signals over network 100. For example, the output circuitry 830 may be comprised within one or more of a graphics adapter, a graphical processing unit, a display port, a Liquid Crystal display, a Light Emitting Diode display, and a transmitter. When the output circuitry 830 is comprised within a transmitter, the output circuitry 830 may, for example, be configured to send communication signals to network nodes 120, or to a remote storage 190 as necessary to invoke the test suite 170, or request one or more of the testing policy 140, policy rules 150, test parameters 160, test suite 170, and network tests 180 (not illustrated in FIG. 9). The input circuitry 840 may be configured to accept input from a user of the management node 130, or receive communication signals from network nodes 120. For example, the input circuitry 840 may be comprised within one or more of a pointing device (such as a mouse, stylus, touchpad, trackball, pointing stick, joystick), a touchscreen, a microphone for speech input, an optical sensor for optical recognition of gestures, a keyboard, and a receiver. When the input circuitry 840 is comprised within a receiver, the input circuitry 840 may be configured to receive communication signals from network nodes 120, accept input from a user at a remote location, and/or receive one or more of the testing policy 140, policy rules 150, test parameters 160, test suite 170, and network tests 180 from a remote storage 190 (not illustrated in FIG. 9).

The memory circuitry 810 is configured to store a testing policy 140 comprising at least one policy rule 150. The processing circuitry 820 is configured to identify a set of network nodes within a network 100, and iteratively filter the set of network nodes 120 in accordance with the testing policy 140. To iteratively filter, the processing circuitry 820 is configured to, in an initial iteration, filter out network nodes 120 that are endpoints of the network 100 from the set of network nodes. For each subsequent iteration, the processing circuitry 820 is configured to determine a filter criteria from one or more of the policy rules 150, and filter out network nodes 120 from the set of network nodes produced by the immediately previous iteration based on the filter criteria. The processing circuitry is further configured to invoke a network test scheme that is compliant with the testing policy 140 and is limited to execution against the set of network nodes produced by the iterative filtering. According to one or more embodiments, the configuration of the processing circuitry 820 is a result of executing machine-readable computer program 850 stored in the memory circuitry 810.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method for filtering network nodes, from a set of network nodes within a network, to implement policy-based testing on a reduced set of network nodes, the method comprising:
    identifying the set of network nodes within the network;
    generating the reduced set of network nodes, from the set of network nodes within the network, based on a testing policy that specifies at least one policy rule and a threshold number of network nodes to which testing is to be limited, wherein the generating the reduced set of network nodes includes:
        initially filtering, from the set of network nodes, those network nodes that are endpoints of the network; and
        subsequently performing iterations of filtering network nodes from the set of network nodes to generate the reduced set of network nodes, wherein the iterations are performed until the reduced set of network nodes is within the threshold number of network nodes, wherein a given iteration of the filtering includes:
            determining filter criteria from the at least one policy rule; and
            filtering network nodes from the set of network nodes based on the filter criteria; and
    invoking a network test scheme, including one or more network tests, that is compliant with the testing policy, wherein the one or more network tests are performed on the reduced set of network nodes.

2. The method of claim 1, wherein the filtering network nodes from the set of network nodes includes filtering network nodes based on a location of the network nodes within the network relative to a network boundary.

3. The method of claim 1, wherein the filtering network nodes from the set of network nodes includes filtering network nodes based on a type of network topology to which the network nodes belong.

4. The method of claim 1, wherein the filtering network nodes from the set of network nodes includes filtering network nodes based on a location of the network nodes within the network relative to a particular administrative boundary within the network.

5. The method of claim 1, wherein the filtering network nodes from the set of network nodes includes filtering network nodes based on a location of the network nodes within the network relative to a type of service boundary within the network.

6. The method of claim 1, wherein the one or more network tests are further limited to execution against one or more particular networking layers.

7. The method of claim 1, wherein the invoking the network test includes selecting the one or more network tests from a suite of available tests based on the reduced set of network nodes.

8. The method of claim 7, wherein the invoking the network test scheme includes configuring execution of the one or more network tests according to a test parameter specified by the testing policy.

9. A system, comprising:
at least one processor; and
a memory having instructions stored thereon that are executable by the at least one processor to cause the system to perform operations for filtering network nodes, from a set of network nodes with a network, to implement policy-based testing on a reduced set of network nodes, wherein the operations comprise:
identifying the set of network nodes within the network;
generating the reduced set of network nodes, from the set of network nodes within the network, based on a testing policy that specifies at least one policy rule and a threshold number of network nodes to which testing is to be limited, wherein the generating the reduced set of network nodes includes:
initially filtering, from the set of network nodes, those network nodes that are endpoints of the network;
subsequently performing iterations of filtering network nodes from the set of network nodes to generate the reduced set of network nodes, wherein the iterations are performed until the reduced set of network nodes is within the threshold number of network nodes, wherein a given iteration of the filtering includes:
determining filter criteria from the at least one policy rule;
filtering network nodes from the set of network nodes based on the filter criteria; and
invoking a network test scheme, including one or more network tests, that is compliant with the testing policy, wherein the one or more network tests are performed on the reduced set of network nodes.

10. The system of claim 9, wherein the filtering network nodes from the set of network nodes includes filtering network nodes based on a location of the network nodes within the network relative to a network boundary.

11. The system of claim 9, wherein the filtering network nodes from the set of network nodes includes filtering network nodes based on a type of network topology to which the network nodes belong.

12. The system of claim 9, wherein the filtering network nodes from the set of network nodes includes filtering network nodes based on a location of the network nodes within the network relative to a particular administrative boundary within the network.

13. The system of claim 9, wherein the filtering network nodes from the set of network nodes includes filtering network nodes based on a location of the network nodes within the network relative to a type of service boundary within the network.

14. The system of claim 9, wherein the one or more network tests are further limited to execution against one or more particular networking layers.

15. The system of claim 9, wherein the invoking the network test scheme includes selecting the one or more network tests from a suite of available tests based on the reduced set of network nodes.

16. The system of claim 15, wherein the invoking the network test scheme includes configuring execution of the one or more network tests according to a test parameter specified by the testing policy.

17. A non-transitory, computer-readable storage medium having instructions stored thereon that are executable by a computing device to perform operations for filtering network nodes, from a set of network nodes within a network, to implement policy-based testing on a reduced set of network nodes, the operations comprising:
identifying the set of network nodes within the network;
generating the reduced set of network nodes, from the set of network nodes within the network, based on a testing policy that specifies at least one policy rule and a threshold number of network nodes to which testing is to be limited, wherein: the generating the reduced set of network nodes includes:
initially filtering, from the set of network nodes, those network nodes that are endpoints of the network;
subsequently performing iterations of filtering network nodes from the set of network nodes to generate the reduced set of network nodes, wherein the iterations are performed until the reduced set of network nodes is within the threshold number of network nodes, wherein a given iteration of the filtering includes:
determining filter criteria from the at least one policy rule;
filtering network nodes from the set of network nodes based on the filter criteria; and
invoking a network test scheme, including one or more network tests, that is compliant with the testing policy, wherein the one or more network tests are performed on the reduced set of network nodes.

* * * * *